US007107122B1

(12) United States Patent
Whyte

(10) Patent No.: US 7,107,122 B1
(45) Date of Patent: Sep. 12, 2006

(54) MEDICINE MANAGER

(76) Inventor: David Whyte, 2623 Barclay Way, Belmont, CA (US) 94002

( * ) Notice: Subject to any disclaimer, the term of this patent is extended or adjusted under 35 U.S.C. 154(b) by 219 days.

(21) Appl. No.: 10/782,310

(22) Filed: Feb. 18, 2004

(51) Int. Cl.
*G06F 17/00* (2006.01)

(52) U.S. Cl. .......................... 700/241; 700/244; 221/2; 221/3; 221/9; 221/12; 221/13; 221/15; 221/123

(58) Field of Classification Search ................ 700/241, 700/244, 236; 221/2, 3, 9, 12, 13, 15, 123, 221/131; 368/10
See application file for complete search history.

(56) References Cited

U.S. PATENT DOCUMENTS

| | | | | |
|---|---|---|---|---|
| 4,423,827 | A * | 1/1984 | Guigan | 221/129 |
| 4,984,709 | A * | 1/1991 | Weinstein | 221/7 |
| 5,752,621 | A * | 5/1998 | Passamante | 221/13 |
| 6,263,259 | B1 * | 7/2001 | Bartur | 700/240 |
| 6,594,549 | B1 * | 7/2003 | Siegel | 700/241 |
| 6,604,650 | B1 * | 8/2003 | Sagar | 221/3 |
| 6,662,081 | B1 * | 12/2003 | Jacober et al. | 700/242 |
| 6,961,285 | B1 * | 11/2005 | Niemiec et al. | 368/10 |
| 6,988,634 | B1 * | 1/2006 | Varis | 221/7 |

* cited by examiner

*Primary Examiner*—Khoi H. Tran
(74) *Attorney, Agent, or Firm*—Robert Samuel Smith

(57) ABSTRACT

An apparatus for enabling a user to follow a detailed schedule for taking a plurality of medicines/supplemdents at various times. The apparatus includes a set of containers, one for each medicine, a release mechanism for each container and a computer programmed to open any one of its containers at a time according to the schedule of events. An event is defined as taking of a dosage at a scheduled time. An "alert" signal alerts the user to prepare for each event. A "take" signal indicates that the dosage has actually been taken, A warning signal; is activated after a 'take period indicating that the user has not taken his dosage. A form is initally filled out by the user listing "events" according to the schedule. Events shown on the screen are underlined as they occur and the daily form with underlines of executed events is saved as a history with later evealuation. A "fresh" form (without uderlines) is programmed to appear with the days date to start the next day's program.

4 Claims, 5 Drawing Sheets

FIG. 7A

Date: June 21, 2000

| CONTAINER | ITEM | STOCK | EVENT 1 | EVENT 2 | EVENT 3 | EVENT 4 | EVENT5 |
|---|---|---|---|---|---|---|---|
| 1 | aspirinn | 25 | 8:00 am | | 12:00 pm | | 8:00 pm |
| 2. | vit. C | 30 | 8:00 am | | | 4::00 pm | |
| 3. | gingko | 21 | | 10:00 am | | | |
| 4. | vit E | 15 | | | 12:00 pm | | |

FIG. 7B

Date: June 21, 2000

| CONTAINER | ITEM | STOCK | EVENT 1 | EVENT 2 | EVENT 3 | EVENT 4 | EVENT5 |
|---|---|---|---|---|---|---|---|
| 1 | aspirin | 25 | 8:00 am | | 12:00 pm | | 8:00 pm |
| 2. | vit. C | 30 | 8:00 am | | | 4::00 pm | |
| 3. | gingko | 21 | | 10:00 am | | | |
| 4. | vit E | 15 | | | 12:00 pm | | |

(underline indicates completed event)

MEDICINE MANAGER

FIELD OF THE INVENTION

This invention relates to systems for organized dispensing of medicines/supplements (items) and particularly to a computer controlled dispenser that delivers various items according to schedule.

BACKGROUND OF THE INVENTION

Many people are in need of taking a number of different kinds of medicine/supplements every day. This activity is very difficult for many individuals to carry out due primarily to forgetfullness and the complexity of the schedule for taking the medicines/supplements. The problem is exaccerbated by the fact that certain medicines/supplements should not be taken close to one another and the time between taking of some medicines/supplements is very critical.

Systems have been disclosed for resolving the problem. For example, U.S. Pat. No. 3,818,473 to Murray et al discloses a pill container having a lower pill-holding portion and an upper cover portion. A battery operated timer and spring-driven escapement having a buzzer opens the container and simultaneously stops the buzzer. The buzzer sounds after a preselected period reminding the user to open the box, take a pill and reset the timer.

U.S. Pat. No. 4,725,999 to Tate discloses a medicine timer including a series of compartments in a row for holding containers of medicines, e.g., pills. Each compartment is associated with a timer by means of a detachable plug. Each timer is settable by means of a rotary pointer and hour marks. Signal is by sound alert and light.

U.S. Pat. No. 6,048,087 to Laurent discloses a "multi-compartment pill box. Prescriptions and schedule are entered by having a physcian program an EEPROM. on a plastic "credit card sized card. This arrangement has the disadvantage compared to the present invention that the user does not "see" a daily history of the days events and changing the conduct of the program is under a physicians control who has the device for writing/rewriting the EEPROM.

SUMMARY OF THE INVENTION

It is an object of this invention to aid people who must take multiple medications/supplements to manage their drugs safely and easily by storing the medications/supplements and alerting the user when it is time to take a particular pill or combination of pills. It is contemplated to enable a user to tell at a glance which items he needs to take soon, which he should take immediately, and which items have been skipped. inadverrtently.

The invention is directed toward a system that has four components:

1.) containers, one container for each item;

2.) sets of indicator lights, each set associated with a respective container;

3.) a speaker or other device for generating audio signals;

4.) a small computer with a keypad and a screen to display text and pictures. The system features:

means for physically moving each item to be taken into a separate container at a prescribed time accompanied by signals from the lights or speaker;

a display on the screen of a up-to-the-minte daily history of the days events and the ability to store the history and retrieve it for study at a later date;

an inventory accounting system wherein the amount of stock remaining in inventory is tabulated and displayed on the screen as a constant reminder to the user to reorder at an appropriate time.

BRIEF DESCRIPTION OF THE FIGURES

FIG. 7A shows the daily form prsented on the screen which the user initially fills out with time of day providng his daily routine. FIG. 7B shows the same form with time underlined to indicate that the item has been taken thereby sutomatically providing the history of the daily program for later evaluation by the user and/or his physician.

DESCRIPTION OF BEST MODES

Figure 1:
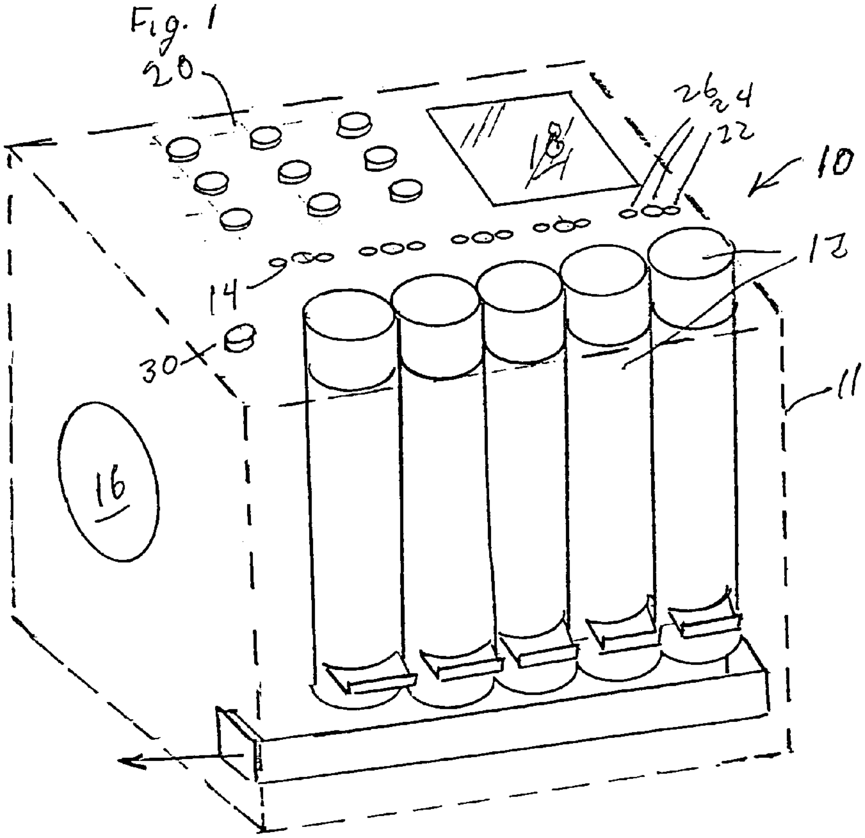
FIG. 1 shows a perspective view of the medicine dispenser representing the various system components.

Turning now to a discussion of the drawings, FIG. 1 is a perspective view of one version of the apparatus of this invention 10 which is a programmable medicine/supplement dispenser. There are shown a row of containers 12, a set of indicator lights 14 for each container and a speaker 16. Each container 12 contains a stack of dosages. There is also shown a computer having a screen 18, a keypad 20. All of the components are enclosed in a housing 11 shown in phantom in FIGS. 1 and 4.

In one embodiment, each set of indicator lights consists of three lights, e.g., a red light 22, a yellow light 24 and a green light 26. The yellow light 24 is activated a period of time (e.g., 30 mins.) before the designated time for taking the respective medicine. The red light 22 turns on and remains on until the dosage is taken. The green light 26 comes on and remains on for a period of time after the dosage has been taken, The speaker generates a sound signal when any red light comes on and remains on for longer than a preset period. indicating that a respective item should be taken.

Figure 2:
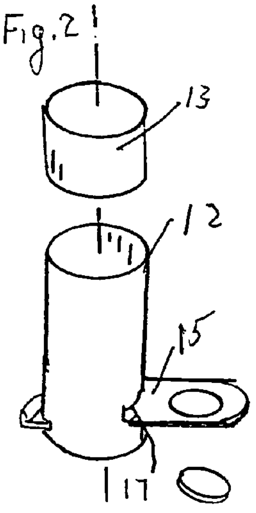
FIG. 2 shows the dispenser of FIG. 1
Figure 3A:
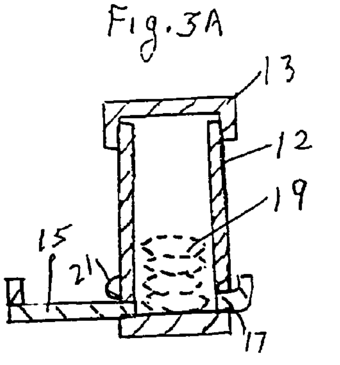
FIGS. 3A and 3B show details of the dispenser of FIG. 2.

FIG. 2 is a perspective view of one of the containers 12 with cap 13 and the slider 15 which slides into a slot in the side of container 12. As illustrated in the sectional views FIGS. 3A and 3B, the user pushes the slider through the slot 17 in the side of container 12 in order to capture a pill 19 and enable the pill to drop out of the container as illustrated in FIG. 3B, When the slider 15 is pushed all of the way through the slot, a switch 21 is closed thereby sending a signal to the computer that the item 19 has dropped out of the container.

Figure 3B:
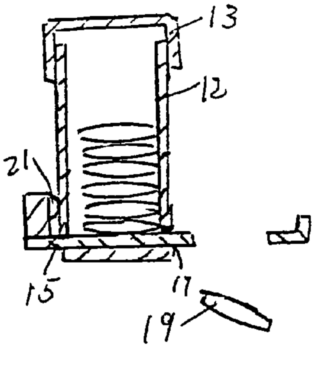
Figure 4:
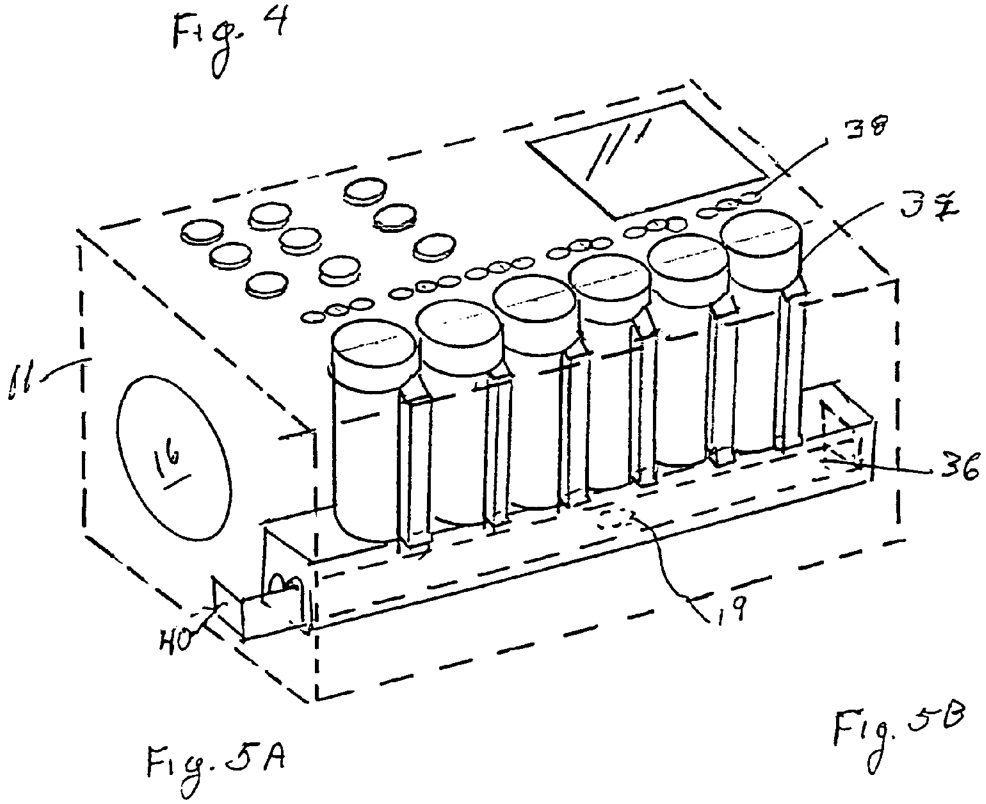
FIG. 4 shows a perspective view of another embodiment of the invention.
Figure 5A:
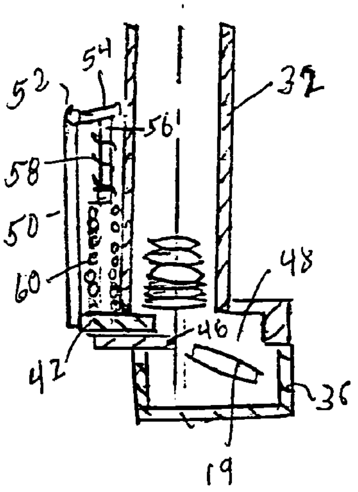
FIGS. 5A and 5B show details of the dispenser of FIG. 4.

FIGS. 4, 5A and 3B show another embodiment of the invention in which each dosage is automatically moved from its container 32 into a separate container (tray) 36 at the prescribed time, accompanied by signals from the lights 38 or speaker 16 indicating the dosage is accessible according to schedule. The user withdraws the dosage 19 from the container (tray) 36 by pulling the plunger 40.

Figure 5B:
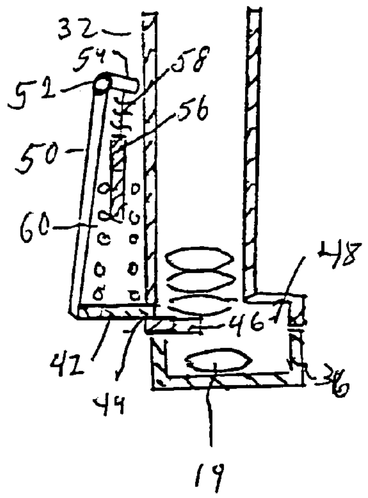

FIGS. 5A and 5B illustrate the release mechanism for dropping a dosage from the respective container 32 into tray 36. There is shown a slider 42 that slides in slot 44 above a short ledge 46. Slider 42 pushes dosage 19 into the opening 48 so that the dosage can drop into the tray 36. The slider is actuated by attachment on the end to a lever 50 that pivots on pin 52. The other end 54 of lever 50 bears against plunger 56 which is biased by spring 58 to be withdrawn from electromagnetic coil 60 until coil 60 is energized according to the schedule stored in the computer.

Indicator lights associated with each container indicate:

1.) The time to take the dosage is approaching;

2.) The time to take the dosage has arrived;

3.) Which dosages have been delivered into the dispensing container.

4.) Whetther or not the user has opened the dispensing container.

The user then need only open one container (tray 36).

Figure 6:
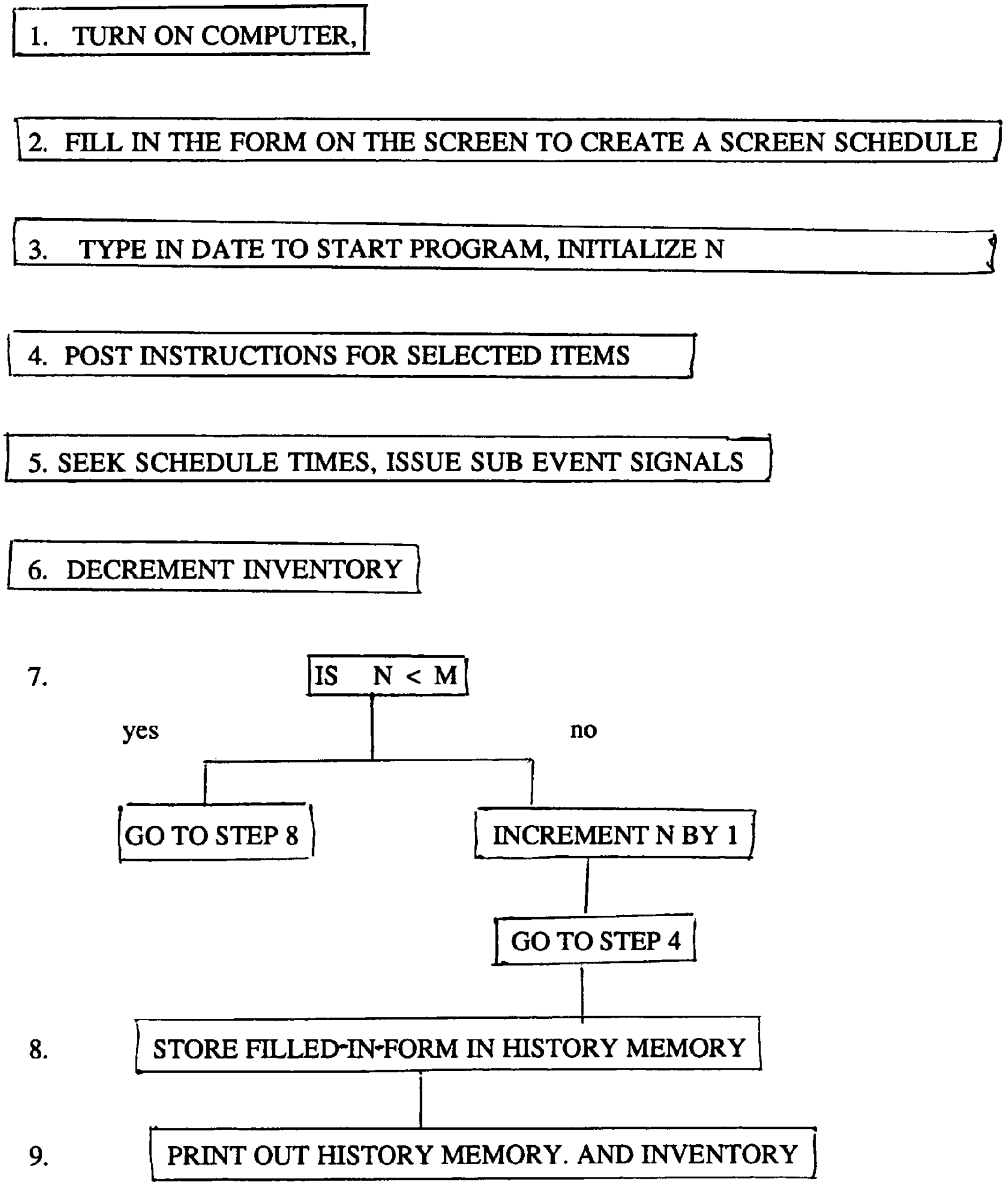
FIG. 6 is a flow chart showing the steps in carrying out the invention.

FIG. 6 is a flow chart of the program that is stored in the computer. for operating the system. The computer has a system clock, a prompter flip flop, an event counter, "a program memory, a data memory, an inventory memory, a processor for operating the program according to the program stored in the program memory, a key board, a port for attachment to a printer (or similar output device such as a floppy disk) for making hard copies of the daily histories of the program.

In the first step, in order to implement the program, the user first turns on the computer thereby activating the screen to show a form. FIG. 7 shows the form at the beginning of the day and FIG. 7B shows the form at the end of the day where all events that have occurred are underlined. FIGS. 7A and 7B show the "screen" schedule.

In the second step, the user "fills out" the form by typing in the required information. He has thereby created a "screen schedule". The first column is a list of numbers where each number represents a container. In the second column, the user lists the medicine/supplement (aspirin, vitamin C, thiamin, etc) to be stacked in the corresponding container. In the third column, the user lists the number of dosages in each stack of dosages. In the following columns, (fourth, fifth, etc.) he lists the time that he is scheduled to take the indicated dosage. This schedule on the form is then stored in memory and the only change in this schedule is the number of dosages that remain in storage. The user activates the program by typing in the date. Thereafter, the date changes automatically every 24 hours. As the day progresses, every time the user takes a dosage at the scheduled time, the time on the screen is automatically marked such as by underline or bold print. At the end of the day, the contents of the screen are stored in a "history" memory for later retrieval (printout) when an overall history is required. A new "fresh" form appears on the screen to chart the next days proceedings which has retained all of the information entered at the prior date but which does not contain the earlier underlining that relates to the previous history.

The "screen" schedule which is viewed on the screen and created by the user by filling in the form, is part of a larger "program" schedule that is stored in memory. The "program" schedule is formatted as a list of "N" events. At any time, the system is said to be operating during the "$N^{th}$" event. Each event includes:

a) the time of the event b) each item to be taken at the respective event, c). the list of instructions pertaining to the respective medicine d.) The list of "sub events" that occur during the event. Typically, a "sub event" will be:

d.i) the "warning" time during the event period when a warning signal is issued that dispensing of medicine is imminent;

d.ii) the "safe" time during the event when the medicine is scheduled to be taken;

d.iii) the "danger" time when the medicine has not been taken.

In the third step, the program schedule is initiated by typing in the date, the clock is initialized and N is set equal to 1 (N=1). This starts the program in the processor running and the processor then takes over the operation of the program.

In the fourth step, which takes place at the beginning of each event, there is presented on the screen the list of instructions pertaining to the $N^{th}$ event. These instructions typically pertain to how the item is administered (e.g., with food, after meals, etc.) whether there are potentially dangerous interactions with food or other drugs.

In the fifth step, the prompter flip flop periodically prompts comparator to compare the "system" time on the system clock to the "schedule" time on the schedule listed for the respective event and when the comparator shows that the system time is later than the schedule time minus the first "sub period" time, then the processor:

1. generates a warning signal that energizes the warning (yellow) light (the first subevent)
2. at the end of the first subevent period;

generates a "dispense signal that activates delivery of the scheduled medicine into the dispenser;

generates a "take" signal" that turns off the warning signal and turns on the green light promoting the user to take the contents of the dispenser;

3. at the end of the second "subevent" period turns off the "take" signal and turns on and leaves on until turn off by the user a red signal if the user has not opened the dispenser.
4. at the end of event period, the program stores in memory the event that has occurred during the event, principally whether or not the medicine has been taken. This "history" section of memory is a table listing for each value of N, a simple yes or no that the medicine has been taken for the corresponding event.

In the sixth step, the number of dosages of the respective medicine listed in inventory is decremented by one thereby maintaining a count of dosages remaining in inventory. in inventory.

In the seventh step, the program compares N to the total number of steps M, that comprise the program. If $N<M$ then the event counter is incremented by 1 and the program returns to returns to step 4. If N=M go to the eighth step.

In the eighth step, the form filled with the underlined times, etc. is stored in the history memory, the date is incremented by one day and a "fresh form" with all of the unerlining removed is presented on the screen i preparation for the following days events.

In the ninth step, which occurs after a designated number of days passes the computer outputs (prints) the contents of the "history" section of memory which is a record of all the medicine/supplements that has been taken. The computer also outputs contents of the inventory memory thereby reminding the user when his stock must be replenished.

There has been described a system and method for organizing a program and prompting a patient to carry out a program prescribed by his doctor. The invention is a valuable aid in assisting a patient to carry out a program of medicine taking that, in some instances, would be too detailed without the assistance of the program. In the context of this specification, the terms "medicine/supplement, dosage, items" are all interconnected.

The invention is an improvement over the cited art in a number of respects including the ability to maintain a record, reducing the tedium that often characterizes such programs, providing a firm basis on which the doctor can evaluate the treatment program, and enabling a user to easily install and manage his own program.

In contrast to the cited art, the computer that is integrated into the storage container is a "personal medicine manager". Its basic function is to track when each dosage is to be taken and to control the indicator lights and speaker to signal to the patient that it is time to take the drug. The arrangement of the apparatus affords very simple and convenient implementation by simply typing numbers on on a with a keyboard that can be viewed on a screen. The same screen automatically tracks and presents the history of the program. The computer program enables the patient and doctor to enter a very detailed program that can be conveniently evaluated.

Variations and modifications of this invention may be contemplated after reading the specification and studying the drawings that are within the scope of the invention.

Figure 8:
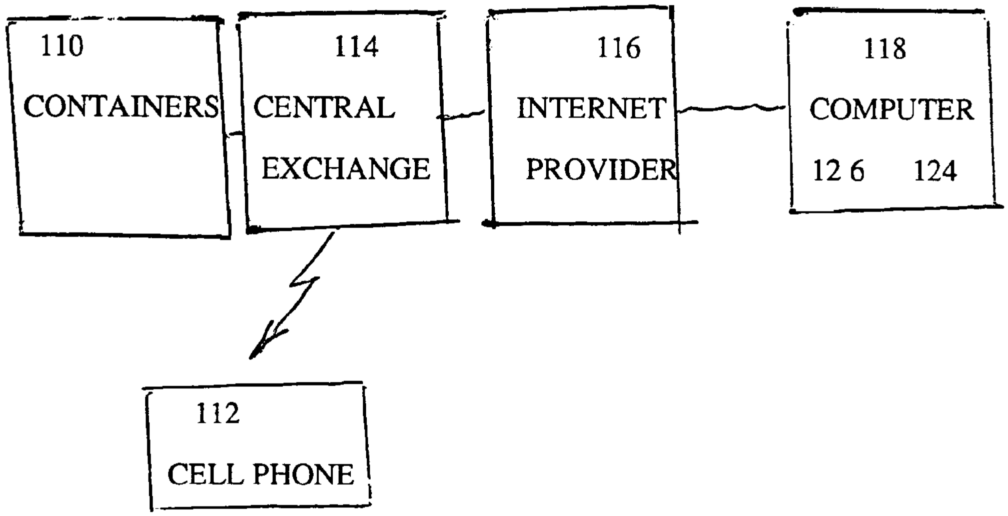
FIG. 8 shows the invention adapted for use with the Internet.

For example, FIG. 8 shows an adaptation of the invention for use on the internet. There are shown a server computer 118 with a monitor 122 and keyboard 120 controlled by an operator (the physician). The client (patient) possesses the plurality of containers 110 with operating mechanisms and a cell phone 112 for communicating with the central exchange 114. The central exchange communicates with the server computer 118 through an internet provider 116 over the internet. The containers thereby receive event signals from the program stored in the memory 124 of the server computer 118.

The physician enters the program containing the event schedule into the memory of the server computer. The central processor unit 126, responding to the program and event schedule stored therein, sends signals to the selected container to release an item according to the event schedule stored in the server computer. The alert signal is sent to the cell phone 112 according to the event schedule and operates to prompt the patient to take the item released by the container mechanism.

In view of these and other embodiments within the scope of the invention, I therefore wish to define the scope of my invention by the appended claims.

What is claimed is:

1. A system for aiding a user to follow a schedule for taking an item of medicines/supplements dispensed as units of dosage in any form of pills, capsules, pouches of powders, which comprises:

a self contained plurality of containers, each container adapted to hold a plurality of dosages of one of the items respectively; and a plurality of mechanisms, one for each said container, for releasing each one of said plurality of dosages from said container respectively, each dosage released one at a time;

a cell phone;

a server computer; adapted for communicating with said plurality of containers and cell phone through an internet provider;

said server computer having a memory for storing a program for operating said apparatus, cell phone, a memory for storing a table for listing an event schedule;

and a processor for executing said program;

said event schedule being a series of events each event defined by an event action and a time when said event action should occur during a program period, said event action being release of at least one of said dosages from said respective container;

a keyboard coupled to said server computer for entering said event schedule into said table in said memory;

a monitor coupled to said server computer for displaying said table including said event schedule;

said table including said event schedule including:

(i) a list of numbers, each number of said list corresponding to one of said containers;

(ii) for each number, a name of an item to be dispatched from said container;

(iii) for each number and corresponding item, a list of events whereby an event schedule is created;

said server computer arranged for sending a signal to said a selected one of said mechanisms to release and item according to said event schedule and an event signal to said cell phone activating said cell phone to generate an audio event signal as each said dosage is released whereby said user is informed that said dosage has been released for ingestion according to said event schedule whereby said system enables an operator to control dispensing items from said containers worn by a patient possessing said containers and cell phone, by said operator operating said keyboard to entering said event schedule into said server computer and said operator is enabled to maintain surveillance of said client's adhering to said event schedule by observing said table displayed by said monitor.

2. The system of claim 1 wherein said event signal comprises an underline under said time of said event on said screen whereby said form becomes a history of events occurring during a program period wherein said program period is a length of time during which all event actions have been executed.

3. The apparatus of claim 2 wherein said program period is 24 hours.

4. A system for aiding a user to follow a schedule for taking an item of medicines/supplements dispensed as units of dosage in any form of pills, capsules, pouches of powders, which comprises:

a plurality of containers, each container adapted to hold a plurality of dosages of one of the items respectively and having a port for passing each one of said dosages;

a sliding door for each one of said containers respectively;

a plurality of solenoids, each one of said solenoids coupled to a respective one of said doors and responsive to an open signal to open said door and thereby release one of said items;

at least one of:

(i) a buzzer;

(ii) a red light, a yellow light, a green light;

a memory for:

(i) storing an operating program;

(ii) keeping track of quantities of dosage remaining in the containers;

(iii) storing a schedule of events, each event defined as release of at least one of said dosages from said respective container and a time of said release;

(iv) storing for each event a subschedule for generating an open signal and an event signal, said event signal being at least one of an audio and visual signal generated:

(a) before each event;

(b) as each event occurs;

(c) after each event;

said event signal being at least one of:

(i) an underline under said time of said event on said screen whereby said event schedule becomes a history of events occurring during a program period wherein said program period is a length of time during shich all event actions have been executed;

(ii) said yellow light energized before said event occurs, said red light energized when said event occurs, said green light energized after said event has occurred;

(iii) a sound from said buzzer;

a processor for operating said system according to said stored operating program;

a keyboard for entering said schedule of events into said memory;

a screen for displaying said schedule of events and a record of occurrence of each event;

an event clock arranged to count an event period being a period of time between two successive events beginning immediately after any one of said events occurs;

said processor coupled to said event clock to control function of said solenoids, keyboard, screen, lights and buzzer according to said schedule of events;

a tray positioned adjacent said plurality of doors operably arranged to catch said dosage released by any one of said plurality of doors.

* * * * *